(12) United States Patent
Katsuura et al.

(10) Patent No.: US 6,324,749 B1
(45) Date of Patent: Dec. 4, 2001

(54) VEHICLE ASSEMBLY LINE

(75) Inventors: Norio Katsuura; Hideaki Sasaki, both of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/486,416

(22) PCT Filed: Jul. 15, 1999

(86) PCT No.: PCT/JP99/03819

§ 371 Date: Feb. 25, 2000

§ 102(e) Date: Feb. 25, 2000

(87) PCT Pub. No.: WO00/03911

PCT Pub. Date: Jan. 27, 2000

(30) Foreign Application Priority Data

Jul. 17, 1998 (JP) .................................................. 10-203345
Jul. 14, 1999 (JP) .................................................. 11-199873

(51) Int. Cl.[7] ..................................................... B23P 21/00
(52) U.S. Cl. ..................... 29/703; 29/402.01; 29/407.01; 29/430; 29/771; 29/783
(58) Field of Search ................................. 29/407.01, 430, 29/458, 469, 701, 702, 703, 711, 720, 771, 783, 791, 824, 402.01

(56) References Cited

U.S. PATENT DOCUMENTS

| | | |
|---|---|---|
| 4,683,651 | 8/1987 | Taketani et al. . |
| 4,709,337 * | 11/1987 | Knapp et al. ........................ 364/468 |
| 4,894,908 * | 1/1990 | Haba, Jr. et al. ...................... 29/783 |
| 5,005,277 * | 4/1991 | Uemura et al. ........................ 29/430 |

FOREIGN PATENT DOCUMENTS

| | | |
|---|---|---|
| 2187683-B1 * | 9/1987 | (GB) . |
| 61-108079 | 10/1984 | (JP) . |
| 61021872-B1 * | 1/1986 | (JP) . |
| 1-285474 | 5/1988 | (JP) . |
| 2-71962 | 9/1988 | (JP) . |
| 5-97076 | 3/1991 | (JP) . |
| 6-155252 | 11/1992 | (JP) . |
| 7-149268 | 11/1993 | (JP) . |
| 7-329845 | 6/1994 | (JP) . |

* cited by examiner

Primary Examiner—S. Thomas Hughes
Assistant Examiner—Jermie E. Cozart
(74) Attorney, Agent, or Firm—Merchant & Gould P.C.

(57) ABSTRACT

A vehicle assembly line comprising, laid out in the order mentioned, a wire leading/transfer trimming zone (20) where components for wire leading/transfer trimming are sequentially assembled to a paint-finished vehicle body (11) for inspection and, if needed, repairing, an interior zone (30) where interior components are sequentially assembled for inspection and, if needed, repairing, an under-floor trimming zone (40) where under-floor dress-up components are sequentially assembled for inspection and, if needed, repairing, an exterior zone (50) where exterior components are sequentially assembled for inspection and, if needed, repairing, and a combined guarantee zone (60) where components not repaired in zones (20) to (50) are inspected and repaired, wherein inspection and repair are conducted in inspection sections and repair sections individually attached to individual functional zones. Since inspection and repair can be finished within each functional zone, defects can be quickly found and quality in each zone can be guaranteed to thereby improve an assembly line production efficiency.

7 Claims, 7 Drawing Sheets

FIG. 7

VEHICLE ASSEMBLY LINE

TECHNICAL FIELD

The present invention relates to an improved automotive vehicle assembly line wherein the assembly line is divided into a plurality of zones according to their functions and positions of an automotive vehicle on which predetermined vehicle components are to be installed and wherein inspection and repair processes are performed at each of the functional zones so that each of the functional zones is allowed to assure functional quality of assembly on its own or on a self-completing basis.

BACKGROUND ART

In conventional automotive vehicle assembly lines as typically disclosed in U.S. Pat. No. 4,683,651, vehicle components are fed to a main assembly line after being subassembled by subassembly lines located outside the main assembly line. The main assembly line includes an automated assembly zone for installing the components via automatic machines and a manual assembly zone for installing the components via human labor downstream of the automated assembly zone, and each vehicle thus assembled is then subjected to inspection at the terminal of the main assembly line.

Namely, according to the conventional automotive vehicle assembly lines, appearance and functionality of each assembled vehicle are examined in an inspection process only after a plurality of assemble processes or zones, and when any improper assembly is identified in the assembled vehicle, the improperly assembled vehicle is normally taken out of the assembly line to be delivered to a common repair process, where the identified improper assembly is repaired to provide a complete assembled vehicle.

Further, with the recent development of vehicle-assembly-information sharing systems based on a computer network, a more sophisticated automotive vehicle assembly line has been proposed, which employs data input and display devices, based on a computer or the like, in inspection and repair processes. In this case, all identified improper assembly occurrences for a vehicle are entered via the data input device by a human operator in charge of the inspection process and the entered improper assembly occurrences are visually displayed on the computer display in the repair process so that the repair process can promptly repair the improperly assembled assemblies on the basis of the displayed occurrence information.

However, because the appearance and functionality inspection is performed in an assembled-vehicle inspection department located after the assembly line and identified improperly assembled assemblies are repaired in a common repair process outside the assembly line (i.e., out-of-line repair process), the conventionally-known automotive vehicle assembly lines would impose enormous loads on the common out-of-line repair process in situations where a great number of occurrences, particularly those occurring at initial assembly stages, are found in the appearance and functionality inspection.

Further, where there are many repair items per identified improper assembly, amounts of information to be fed from the repair process to the production-related departments become enormous, which would unavoidably lead to time delays in dealing with the improperly assembled assemblies.

It is therefore an object of the present invention to provide an automotive vehicle assembly line which readily achieves effective mutual assistance between human operators deployed at various workstations along the assembly line and can promptly identify an improper assembly.

DISCLOSURE OF THE INVENTION

According to an aspect of the present invention, there is provided an improved automotive vehicle assembly line for sequentially installing predetermined components on a vehicle body having undergone a painting process and inspecting installation of the components so as to provide a completely-assembled automotive vehicle, which is characterized in that the predetermined components are assigned to a plurality of functional zones according to functions of the components, positions of the vehicle where the components are to be installed and procedures for installing the components on the vehicle, the plurality of functional zones are connected together in series to organize the automotive vehicle assembly line, and there are provided, at a downstream end portion of each of the functional zones, an inspection station for performing a static inspection process that can be done without causing the vehicle to actually run and a repair station for performing a necessary repair process on the basis of occurrence information indicative of an improper assembly identified through the static inspection process performed by the inspection station.

In one specific implementation, the plurality of functional zones include: a wiring/piping and communication equipment zone for installing wiring/piping-related components on an underside, engine room, passenger cell and trunk of the vehicle body having undergone the painting process and also installing auxiliary equipment on the vehicle body; an interior equipment zone for installing interior components, including an instrument panel, pedals, floor mats, ceiling lining and side lining, to the vehicle body passed from the wiring/piping and communication equipment zone; an underside equipment zone for installing underside components, including a suspension and an engine, on the vehicle body passed from the interior equipment zone, the underside components being installed on the vehicle body from underneath the vehicle body; and an exterior equipment zone for installing exterior components, including windowpanes and a bumper, on the vehicle body passed from the underside equipment zone.

The automotive vehicle assembly line of the present invention may further include, downstream of the exterior equipment zone, a complex quality assurance zone for inspecting an item that was not inspected by the respective inspection stations of the functional zones and making repairs of the item if necessary.

The complex quality assurance zone may include a complex inspection process and a dress up process following the complex inspection process, and the complex inspection process is directed to inspecting the item that was not inspected by the respective inspection stations of the functional zones and an item that could not be repaired by the respective repair stations of the functional zones. The complex quality assurance zone further includes an in-line repair process for making repairs on the basis of inspection information indicative of results of the inspection made by the complex inspection process.

The automotive vehicle assembly line of the present invention may further include computer network means for managing occurrence information indicative of improper assembly identified via the inspection stations of the functional zones, as well as data indicative of unrepaired items and sent from the respective repair stations of the functional zones.

The computer network means may include a plurality of displays located in each of the functional zones in such a manner that the displays in each of the functional zones can visually present not only data pertaining to the functional zone but also data pertaining to the other functional zones.

The computer network means may further include a host computer for supplying data to production-related departments in the automotive vehicle assembly line.

BEST MODE FOR CARRYING OUT THE INVENTION

Figure 1:
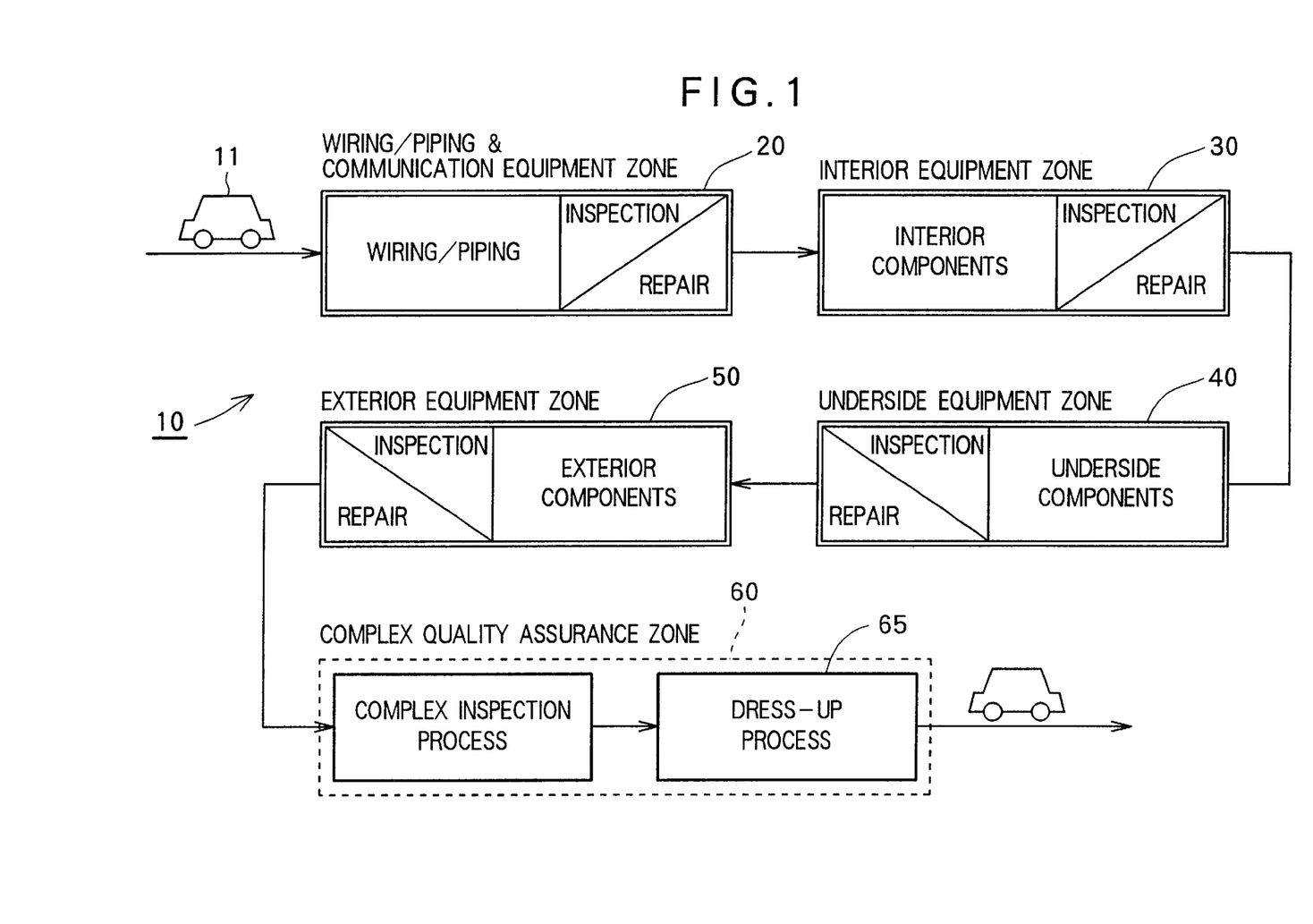
FIG. 1 a diagram showing a general organization of an automotive vehicle assembly line in accordance with the present invention.

FIG. 1 is a diagram showing a general organization of an automotive vehicle assembly line in accordance with the present invention. This automotive vehicle assembly line 10 is divided into a plurality of functional zones, which include: a wiring/piping and communication equipment zone 20 for sequentially installing wiring/piping- and communication-related components on a vehicle body 11 having undergone a painting process and inspecting and, if necessary, repairing installation of the wiring/piping- and communication-related components; an interior equipment zone 30 for sequentially installing interior components on the vehicle body 11 passed from the wiring/piping and communication equipment zone 20 and inspecting and, if necessary, repairing installation of the interior components; an underside equipment zone 40 for sequentially installing underside components on the vehicle body 11 passed from the interior equipment zone 30 and inspecting and, if necessary, repairing installation of the underside components; an exterior equipment zone 50 for sequentially installing exterior components on the vehicle body 11 passed from the underside equipment zone 40 and inspecting and, if necessary, repairing installation of the exterior components; and a complex quality assurance zone 60 for performing inspection and repair processes on each item that was not repaired in the other zones 20 to 50 (including repairs on such items that could not be repaired by respective repair stations of the other zones), in the order of mentioning.

Figure 2:
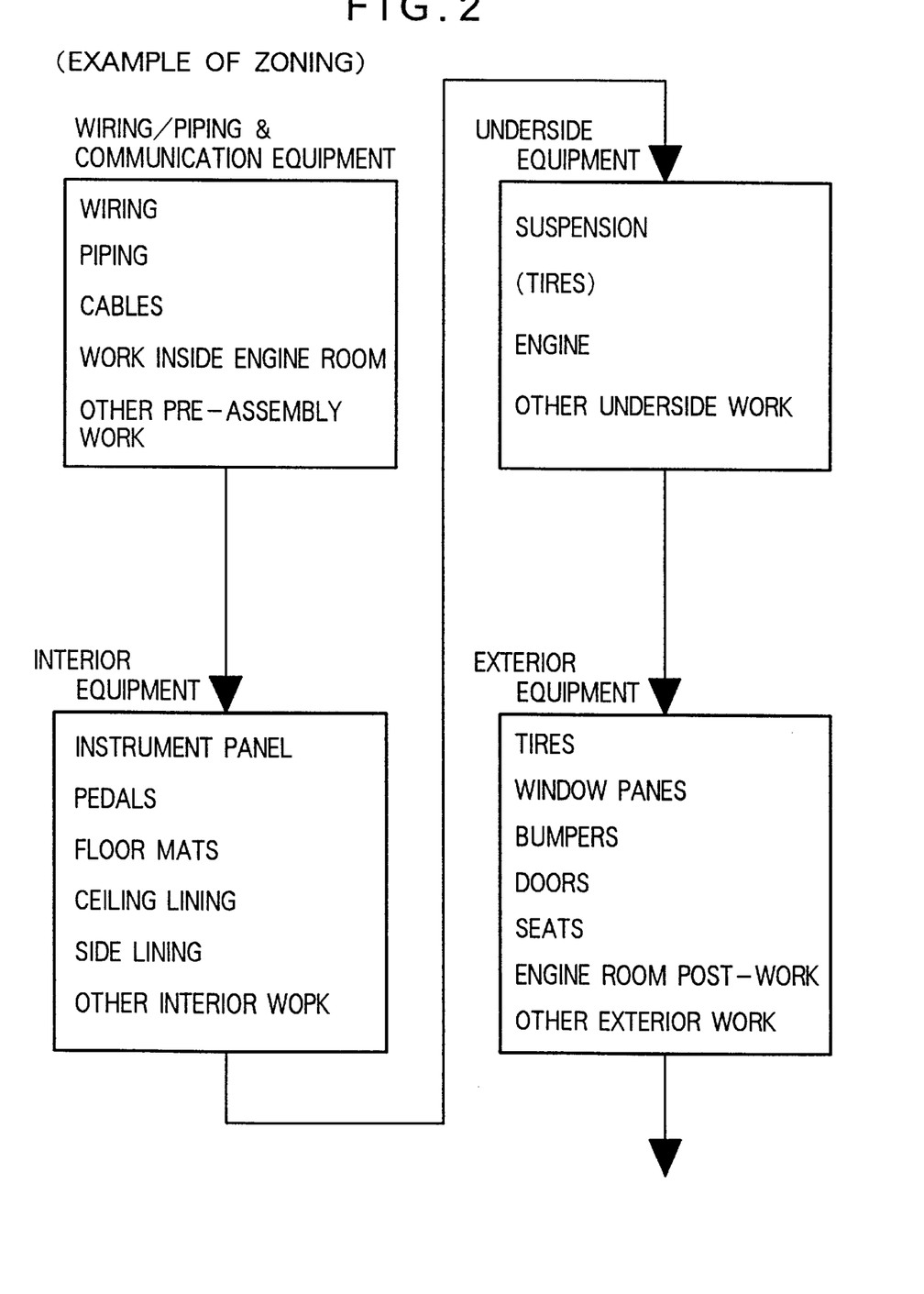
FIG. 2 is a diagram explanatory of zoning in the automotive vehicle assembly line of the present invention.

FIG. 2 is a diagram more fully explaining the zoning in the automotive vehicle assembly line of the present invention. The wiring/piping and communication equipment zone is devoted to performing wiring, piping, cable installation, work inside the engine room and other necessary pre-assembly work. The interior equipment zone is devoted to installing an instrument panel, pedals, floor mats, ceiling lining and side lining and performing other interior work.

The underside equipment zone is devoted to installing a suspension, (tires), engine and other components to be installed from underneath a vehicle body. Although the tires are, in principle, installed in the following exterior equipment zone, they may be installed in this underside equipment zone if desired. The exterior equipment zone is devoted to installing the tires, windowpanes, bumpers, doors, seats, performing engine room post-work and installing other exterior components.

Figure 3:
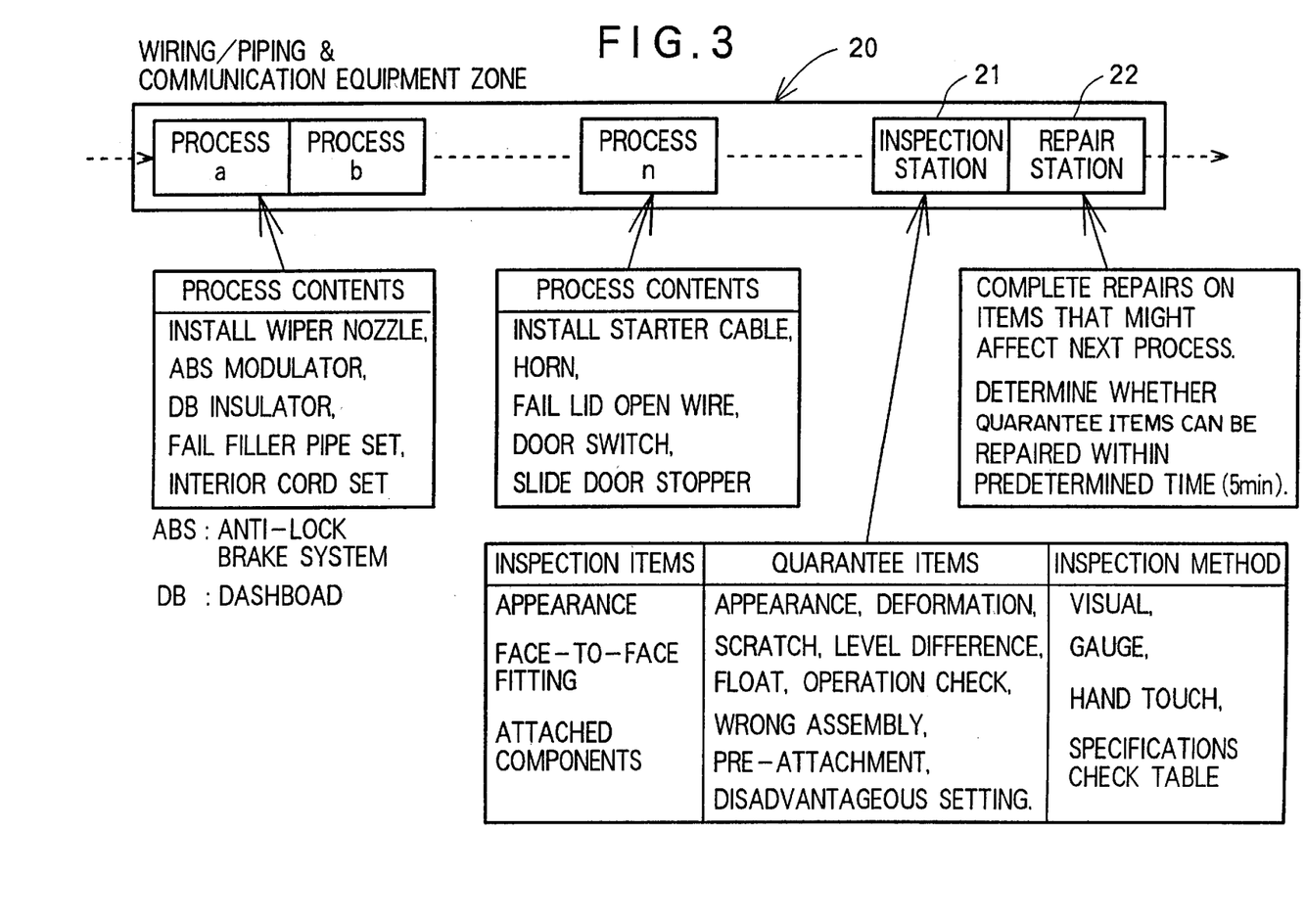
FIG. 3 is a block diagram showing details of a wiring/piping and communication equipment zone shown in FIG. 1.

FIG. 3 is a diagram explaining details of the wiring/piping and communication equipment zone 20 of FIG. 1. The wiring/piping and communication equipment zone 20 installs the wiring/piping- and communication-related components sequentially through a plurality of processes (process a→process b→ . . . →process n). Upon completion of the necessary installation work in the wiring/piping and communication equipment zone 20, the zone 20 inspects the installation by means of its own inspection station 21 and repairs an improper assembly, if any, by means of its own repair station 22 on the basis of occurrence information indicative of the improper assembly identified by the inspection station 21. For example, a wiper nozzle and the like are installed in "process a", and a starter cable and the like are installed in "process n".

The repair station 22 of the wiring/piping and communication equipment zone 20 completely repairs every item that might significantly affect the next process unless repaired by the station 22. The repair station 22 determines whether or not to perform the necessary repairs, by ascertaining whether or not the necessary repairs can be completed within a predetermined time period (e.g., five minutes).

Internal construction of the interior equipment zone 30, underside equipment zone 40 and exterior equipment zone 50 will not be described here because it is similar to that of the wiring/piping and communication equipment zone 20 as set forth above in relation to FIG. 3.

Figure 4:
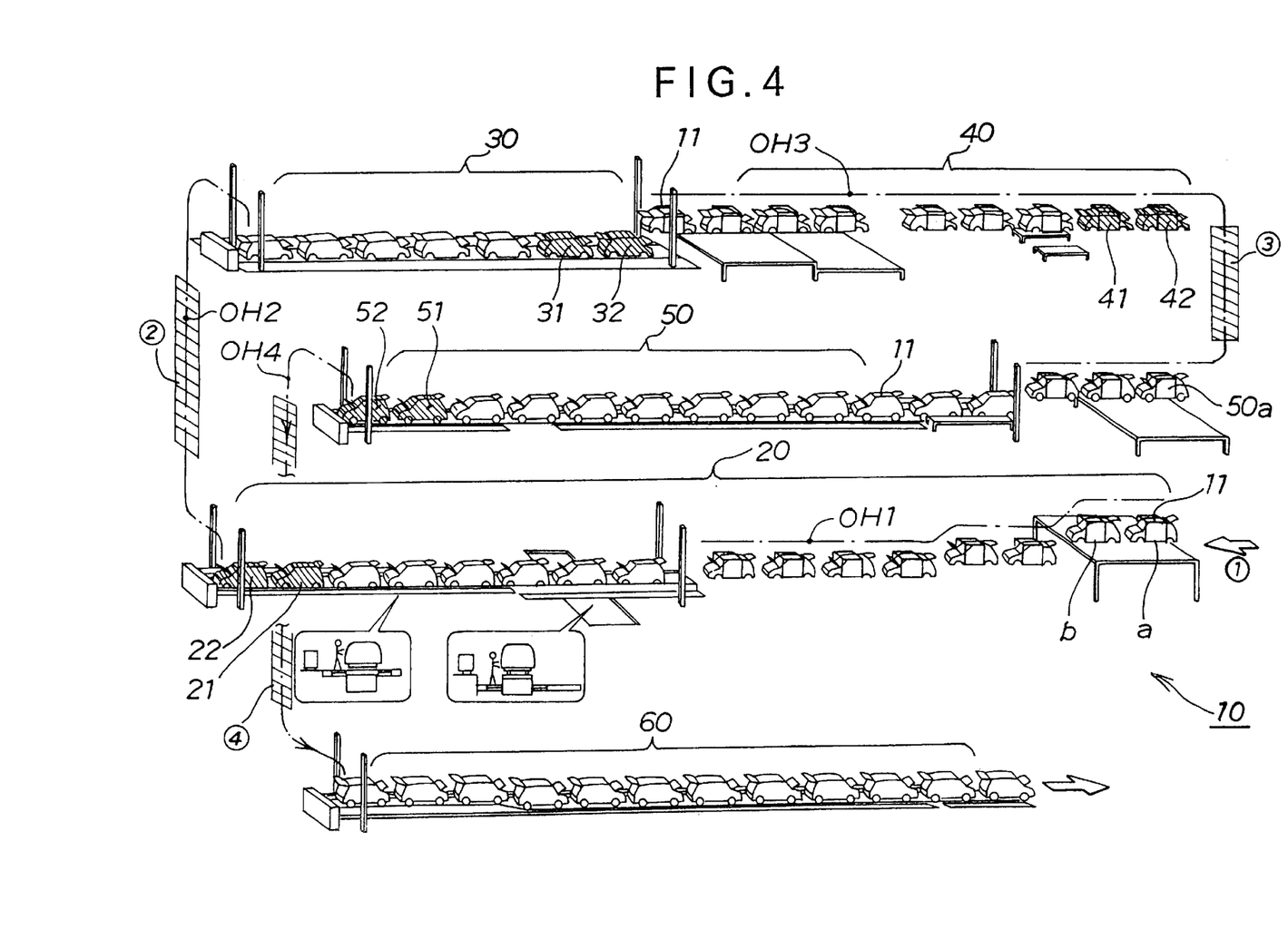
FIG. 4 is a view schematically showing an exemplary overall arrangement of the inventive automotive vehicle assembly line.

FIG. 4 is a view showing an exemplary overall arrangement of the inventive automotive vehicle assembly line. In the illustrated example, a vehicle body 11, having undergone the painting process (not shown), is transported via an overhead conveyor OH1 into the assembly line 10, as indicated by white-out arrow ①. First, necessary components are installed on the underside of the vehicle body 11 by varying the height of the overhead conveyor OH1 as necessary, and then the vehicle body 11 is passed to the wiring/piping and communication equipment zone 20, where human operators sequentially install piping-related components, auxiliary components, etc. on the vehicle body 11 on a slat conveyor that is a type of floor conveyor. Then, in a downstream end portion of the wiring/piping and communication equipment zone 20, the inspection station 21 performs a zone inspection process, and the repair station 22 performs a zone repair process as necessary.

After that, the vehicle body 11, having undergone the above-described operations in the wiring/piping and communication equipment zone 20, is removed onto another overhead conveyor OH2, via which the vehicle body 11 is delivered to the interior equipment zone 30. Various interior components, such as the instrument panel, are sequentially installed on the vehicle body 11 in the interior equipment zone 30 using a slat conveyor as its transportation means. Then, in a downstream end portion of the interior equipment zone 30, the inspection station 31 performs a zone inspection process, and the repair station 32 performs a zone repair process as necessary.

At the exit of the interior equipment zone 30, the vehicle body 11 is removed onto still another overhead conveyor OH3, via which the vehicle body 11 is delivered to the underside equipment zone 40. Various underside components, such as the engine, are sequentially installed on the vehicle body 11 in the underside equipment zone 40. In this case, human operators can freely get under the vehicle body 11 because the vehicle body 11 is lifted via the overhead conveyor OH3; thus, in the underside equipment zone 40, the underside components can be installed very efficiently. Then, in a downstream end portion of the underside equipment zone 40, the inspection station 41 performs a zone inspection process, and the repair station 42 performs a zone repair process as necessary.

In the next exterior equipment zone 50, the tires are installed on the vehicle body 11 in a process designated at 50a while the vehicle body 11 is being hung down from and transported via the overhead conveyor OH3. After that, the vehicle body 11 is removed on another slat conveyor, and various exterior components, such as the doors and windowpanes, are installed on the vehicle body 11 during transportation via the slat conveyor. Then, in a downstream end portion of the exterior equipment zone 50, the inspection station 51 performs a zone inspection process, and the repair station 52 performs a zone repair process as necessary.

After that, the vehicle body 11, having undergone the operations in the exterior equipment zone 50, is removed onto still another overhead conveyor OH4, via which it is passed to the complex quality assurance zone 60. In the complex quality assurance zone 60, processes are performed for injecting liquid into the piping, installing a battery on the vehicle body 11 and injecting gasoline. Also performed are an inspection process for ascertaining proper operation of the electrical equipment and engine starter mechanism and a necessary repair process.

In the preferred embodiment of the present invention, storage functions are provided between the wiring/piping and communication equipment zone 20 and the interior equipment zone 30, between the underside equipment zone 40 and the exterior equipment zone 50 and between the exterior equipment zone 50 and the complex quality assurance zone 60 in order to accommodate a line tact change resulting from variations in the times required for the inspection and repair processes, as shown in FIG. 4; specifically, the storage functions are performed by the overhead conveyors OH2, OH3 and OH4 as represented in FIG. 4 by reference numerals ②, ③ and ④.

Figure 5:
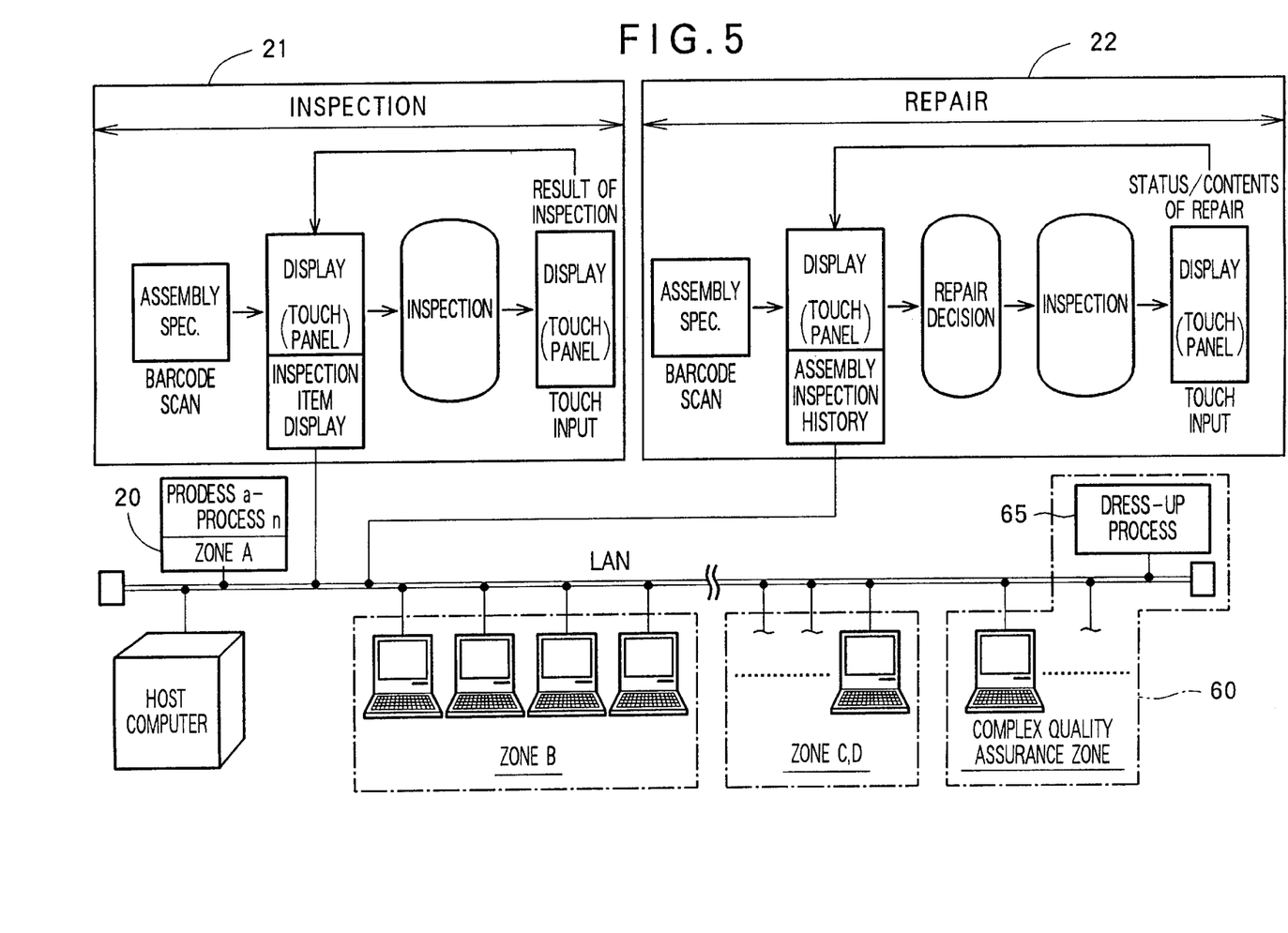
FIG. 5 is a block diagram explanatory of zone inspection processes in individual functional zones and a computer LAN network to which the zone inspection processes are connected.

FIG. 5 is a block diagram explanatory of the zone inspection processes of the individual functional zones and a computer LAN network to which the zone inspection processes are connected. In each of the above-described functional zones, the inspection station 21, 31, 41, 51 uses a bar code reader to read out a vehicle number and the like from a host computer's memory, visually displays read-out assembly specifications on a data input/display device such as a touch panel display, and performs the inspection process on the basis of the assembly specifications.

Results of the inspection process, together with the identified improper assembly occurrences, are entered via a touch panel screen or a keyboard (not shown), and the thus-entered data are fed back to all of the other production-related departments so as to be visually displayed on respective computer displays of the departments. In FIG. 5, zone A, zone B, zone C and zone D correspond to the wiring/piping and communication equipment zone 20, interior equipment zone 30, underside equipment zone 40 and exterior equipment zone 50, respectively, of FIG. 2 and also correspond to functional zone A, functional zone B, functional zone C and functional zone D, respectively, of FIG. 7.

A human operator in charge of the repair process reads out the assembly specifications using a bar code reader and causes the improper assembly occurrence information, supplied from the corresponding inspection station 21, 31, 41 or 51, to be visually displayed on a data-input/display device such as a touch panel display. Then, the repair operator determines whether or not any of the improperly assembled assemblies can be repaired in the zone to which the operator is assigned, and, if there is any improper assembly repairable by that zone, causes the corresponding repair station 22, 32, 42 or 52 to repair the improper assembly in accordance with a predetermined repair standard. Further, the repair operator enters data indicative of both of the repaired and unrepaired improperly assembled assemblies via the touch panel screen so that the entered data are displayed not only on the computer display in the zone to which the operator is assigned but also the computer displays in all of the other production-related departments.

Because the zone inspection and repair processes are performed in each of the functional zones, immediately after a last step (nth step) in that functional zone, for inspecting the assembled state in the functional zone and then repairing identified improper assembly so long as the assemblies are considered repairable by the functional zone as set forth above, quality assurance corresponding only to the assembly operations in the functional zone can be given and only the improperly assembled items considered non-repairable by the functional zone can be passed to any necessary departments such as the complex quality assurance zone 60.

Further, because each of the zones repairs every improper assembly that has occurred in the zone and is considered repairable thereby and then feeds the repair data back to the assembly processes of that zone, contents of the repairs actually made can be immediately reflected in the assembly processes of the zone.

Figure 6:
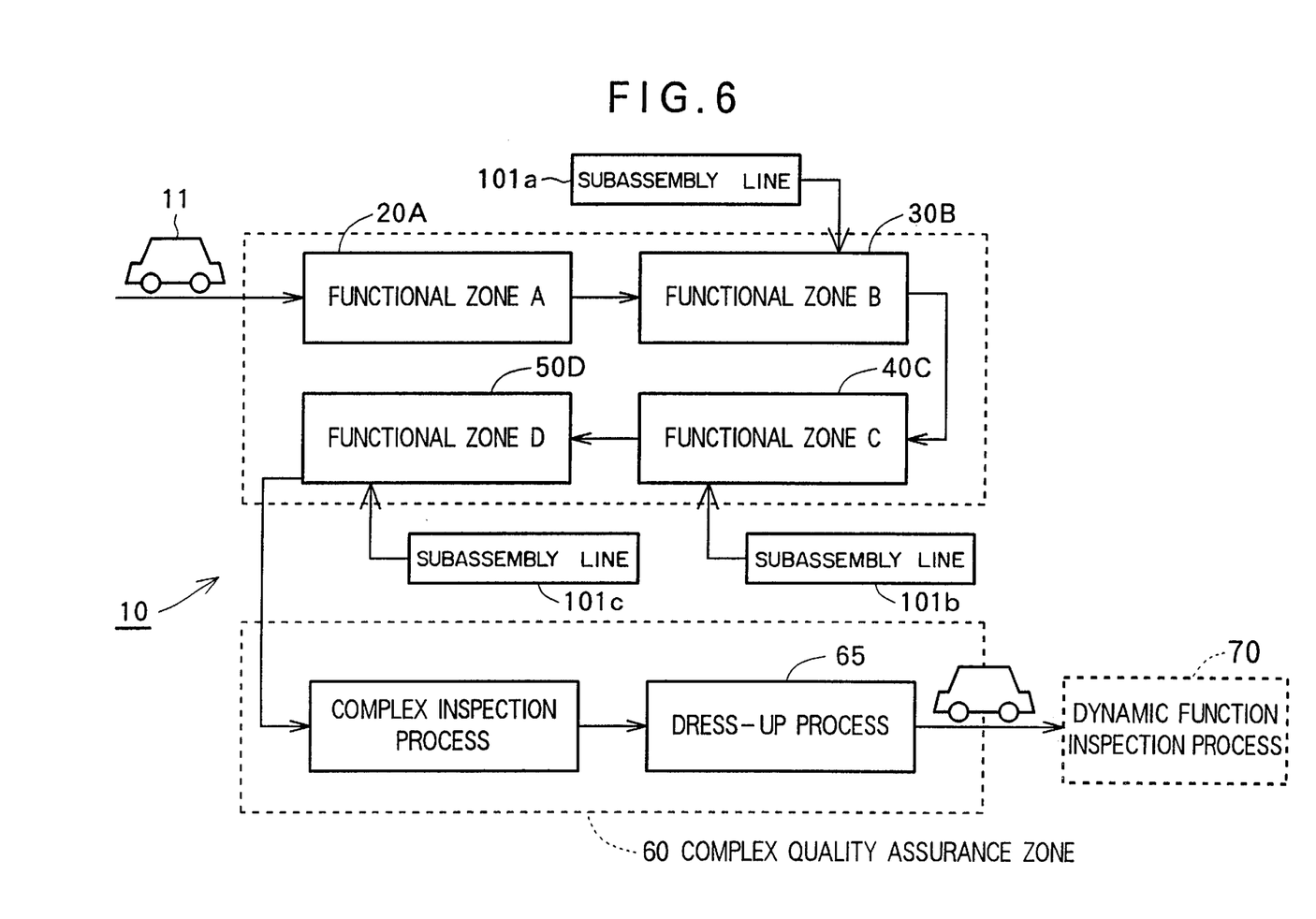
FIG. 6 is a block diagram showing a generalized layout of the inventive automotive vehicle assembly line.

Furthermore, the contents of the repairs actually made can be reflected in the assembly processes of the zone on the basis of the repair data fed back from a dress up process of FIG. 1, and thus the quality of assembly effected in the zone can be assured independently by the zone. FIG. 6 is a block diagram showing a generalized layout of the automotive vehicle assembly line shown in FIG. 1. In FIG. 6, the automotive vehicle assembly line 10 includes functional zone A (20A), functional zone B (30B), functional zone C (40C), functional zone D (50D) and a complex quality assurance zone 60.

For each of functional zone B, functional zone C and functional zone D, a subassembly line 101a, 101b or 101c assembles a function unit (e.g., the subassembly line 101a assembles the instrument panel, the subassembly line 101b assembles the engine and the subassembly line 101c assembles the door). An inspection station is provided at the downstream end of each of these subassembly lines, so as to assure the quality of each subassembly to be supplied from the subassembly line to the main assembly line.

The automotive vehicle assembly line may be divided into the functional zones on the basis of grouping of the vehicle components by their functions and positions of an automotive vehicle where they are to be installed, and the division into the functional zones may be varied depending on various conditions such as the vehicle type.

Although not specifically shown, each of functional zone A (20A), functional zone B (30B), functional zone C (40C) and functional zone D (50D) includes an inspection station for performing a zone inspection process and a repair station for performing a necessary zone repair process.

Figure 7:
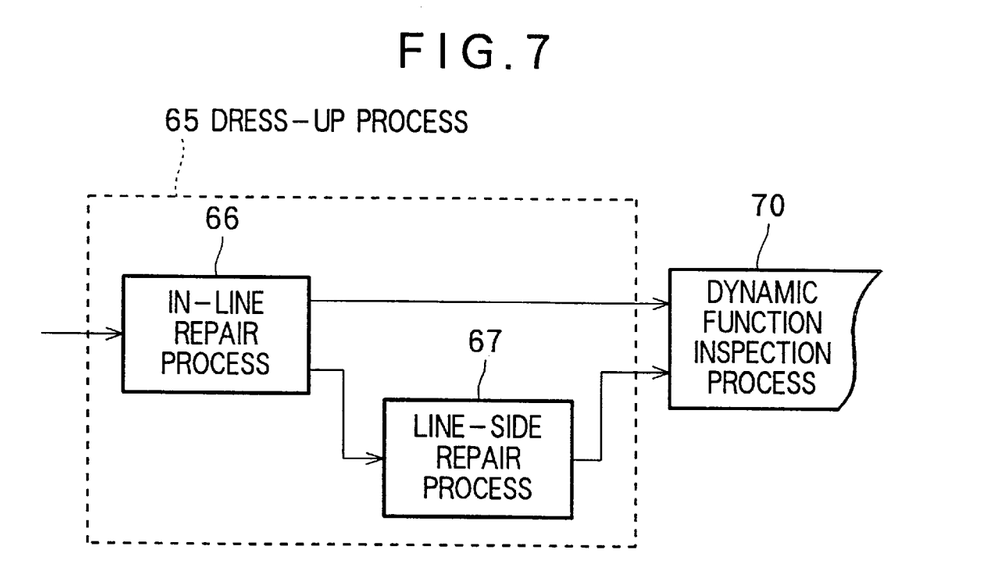
FIG. 7 is a block diagram of a dress up process performed in the inventive automotive vehicle assembly line.

FIG. 7 is a block diagram showing details of the dress up process 65 of FIG. 1.

As shown, the dress up process 65 includes an in-line repair process 66 and a line-side repair process 67.

The in-line repair process 66 virtually displays, on a computer display located within the process 66, the improper assembly information transmitted from the respective inspection stations of the individual functional zones 20 to 50 and completely repairs all the identified improperly assembled assemblies in-line on the basis of the displayed improper assembly information. Thus, the static function of each assembled automotive vehicle is assured to be within static function specifications, and the vehicle with the assured static function is then conveyed from the in-line repair process 66 to a dynamic function inspection process 70 that is a next process set in the automotive vehicle assembly line.

The line-side repair process 67 of the in-line repair process 66 visually displays, on a computer display located within the process 67, the improper assembly information transmitted from the inspection stations of the individual functional zones 20 to 50 and, on the basis of the displayed improper assembly information, completely repairs those of the improperly assembled assemblies which could not be repaired by the in-line repair process 66 (e.g., due to an insufficient in-line repair time). Thus, the static function of each assembled automotive vehicle is assured to be within the static function specifications, and the vehicle with the assured static function is then conveyed from the line-side repair process 67 to the dynamic function inspection process 70.

As has been described so far, the automotive vehicle assembly line of the present invention is characterized in that it is divided into a plurality of functional zones and inspection and repair stations are provided in each of the functional zones in such a way that the static function quality of every assembled vehicle in each of the functional zones can be assured by that functional zone. Such novel arrangement provides a self-completing automotive vehicle assembly line which achieves an enhanced production efficiency in each of the static functional zones.

Further, because zone inspection and repair processes are performed in each of the functional zones to inspect zone-specific static functions and to repair an improper assembly identified through the inspection on a self-diagnostic and self-remedy basis, each of the functional zones is allowed to assure the static function quality within that functional zone independently of the other functional zones and thereby effectively enhance the production efficiency.

Furthermore, owing to the feedback of the repair data from the individual functional zones and the complex quality assurance zone, appropriate measures against identified improper assembly can be immediately reflected in the vehicle assembly operations of each of the functional zones, which permits quality stabilization at an early stage of the vehicle production.

What is claimed is:

1. An automotive vehicle assembly line for sequentially installing predetermined components on a vehicle body having undergone a painting process and inspecting installation of the components so as to provide a complete assembled automotive vehicle, characterized in that the predetermined components are assigned to a plurality of functional zones according to functions of the components, positions of the vehicles where the components are to be installed and procedures for installing the components on the vehicle, said plurality of functional zones are connected together in series to organize said automotive vehicle assembly line, and there are provided, at a downstream end portion of each of said functional zones, an inspection station for performing a static inspection process that can be done without operating the vehicle and a repair station for performing a necessary repair process on the basis of information indicative of an improper assembly identified through the static inspection process performed by said inspection station.

2. An automotive vehicle assembly line as recited in claim 1 wherein said plurality of functional zones include:

a wiring/piping and communication equipment zone for installing wiring/piping-related components on an underside, engine room, passenger cell and trunk of the vehicle body having undergone the painting process and also installing auxiliary equipment on the vehicle body;

an interior equipment zone for installing interior components, including an instrument panel, pedals, floor mats, ceiling lining and side lining, to the vehicle body passed from said wiring/piping and communication equipment zone;

an underside equipment zone for installing underside components, including a suspension and an engine, on the vehicle body passed from said interior equipment zone, the underside components being installed on the vehicle body from underneath the vehicle body; and an exterior equipment zone for installing exterior components, including windowpanes and a bumper, on the vehicle body passed from said underside equipment zone.

3. An automotive vehicle assembly line as recited in claim 2 which further includes, downstream of said exterior equipment zone, a complex quality assurance zone for inspecting an item that was not inspected by said inspection stations of said functional zones and making repairs of the item if necessary.

4. An automotive vehicle assembly line as recited in claim 3 wherein said complex quality assurance zone includes a complex inspection process and a dress up process following the complex inspection process and said complex inspection process is directed to inspecting the item that was not inspected by said inspection stations of said functional zones and an item that could not be repaired by said repair stations of said functional zones, and wherein said complex quality assurance zone further includes an in-line repair process for making repairs on the basis of inspection information indicative of results of inspection made by the complex inspection process.

5. An automotive vehicle assembly line as recited in claim 1 which further comprises computer network means for managing the information indicative of improper assembly identified via said inspection stations of said functional zones, as well as data indicative of unrepaired items and sent from said repair stations of said functional zones.

6. An automotive vehicle assembly line as recited in claim 5 wherein said computer network means includes a plurality of displays located in each of said functional zones and the displays in each of said functional zones visually present not only data pertaining to said functional zone but also data pertaining to the rest of said functional zones.

7. An automotive vehicle assembly line as recited in claim 5 wherein said computer network means includes a host computer for supplying data to production-related departments in said automotive vehicle assembly line.

* * * * *